United States Patent
Sapozhnikov et al.

(10) Patent No.: US 10,614,840 B1
(45) Date of Patent: Apr. 7, 2020

(54) READER WITH SHAPE OPTIMIZED FOR HIGHER SNR

(71) Applicant: Seagate Technology LLC, Cupertino, CA (US)

(72) Inventors: Victor Sapozhnikov, Minnetonka, MN (US); Taras Grigorievich Pokhil, Arden Hills, MN (US); Mohammed Shariat Ullah Patwari, Edina, MN (US); Yonghua Chen, Bloomington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 2 days.

(21) Appl. No.: 15/800,684

(22) Filed: Nov. 1, 2017

Related U.S. Application Data

(60) Provisional application No. 62/530,918, filed on Jul. 11, 2017.

(51) Int. Cl.
*G11B 5/39* (2006.01)
*G11B 5/31* (2006.01)

(52) U.S. Cl.
CPC ............ *G11B 5/398* (2013.01); *G11B 5/3166* (2013.01); *G11B 5/3906* (2013.01); *G11B 5/3932* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 5,739,990 A | 4/1998 | Ravipati et al. | |
| 5,748,415 A | 5/1998 | Christner et al. | |
| 6,426,853 B1 | 7/2002 | Sakai et al. | |
| 8,339,752 B1* | 12/2012 | Hattori et al. | G11B 5/398 360/324.12 |
| 8,395,867 B2* | 3/2013 | Dimitrov et al. | G11B 5/3912 360/319 |
| 8,582,251 B2 | 11/2013 | Gao et al. | |
| 8,599,520 B1* | 12/2013 | Liu et al. | G11B 5/3932 360/324.1 |
| 8,724,265 B2 | 5/2014 | Qiu et al. | |
| 8,767,356 B2* | 7/2014 | Leung et al. | G11B 5/3932 360/324.12 |
| 9,001,473 B1* | 4/2015 | Gao et al. | G11B 5/398 360/324.11 |
| 2001/0038927 A1* | 11/2001 | Hasewaga | G11B 5/3903 428/811 |
| 2003/0002229 A1 | 1/2003 | Pinarbasi | |
| 2007/0230066 A1* | 10/2007 | Gill | G11B 5/398 360/324.1 |

(Continued)

*Primary Examiner* — Craig A. Renner
(74) *Attorney, Agent, or Firm* — Westman, Champlin & Koehler, P.A.

(57) ABSTRACT

A recording head that includes a reader having a front end at a bearing surface of the recording head and a rear end behind the bearing surface. The reader has a non-rectangular shape with a front-end width that is less than an average width of the reader. A first bias element is positioned proximate to a first side of the reader, and a second bias element is positioned proximate to a second side of the reader. Each of the first and second bias elements has a bias level that is a function of a ratio of the front-end width to the average width of the reader.

9 Claims, 9 Drawing Sheets

(56) References Cited

U.S. PATENT DOCUMENTS

| | | | |
|---|---|---|---|
| 2008/0117552 A1* | 5/2008 | Zhou et al. | G11B 5/3932 360/319 |
| 2010/0302688 A1* | 12/2010 | Shiimoto et al. | G11B 5/3932 360/319 |
| 2011/0050211 A1 | 3/2011 | Gao et al. | |
| 2011/0051294 A1* | 3/2011 | Gao et al. | G11B 5/3932 360/313 |
| 2011/0134564 A1* | 6/2011 | Yoshida et al. | G11B 5/398 360/75 |

* cited by examiner

READER WITH SHAPE OPTIMIZED FOR HIGHER SNR

CROSS-REFERENCE TO RELATED APPLICATIONS

This application is a non-provisional application of U.S. Provisional Application No. 62/530,918, filed on Jul. 11, 2017, the content of which is hereby incorporated in its entirety.

BACKGROUND

Data storage devices, such as disc drives, use magnetic recording heads to read and/or write data on magnetic storage media, such as a data storage discs. In a typical disc drive, one or more discs are mounted on a spindle motor, which causes the disc(s) to spin. Recording heads carried by a slider are used to read from and write to data tracks on the disc(s). The slider is typically carried by a head arm assembly that includes an actuator arm and a suspension assembly. During operation, as the disc spins, the slider glides above the surface of the disc on a small cushion of air, for example, and the actuator arm pivots to movably position the slider with respect to the disc.

As areal recording densities for storage discs increase, technological advances and changes to various components of the disc drives are needed.

SUMMARY

In one embodiment, a recording head is provided. The recording head includes a reader having a front end at a bearing surface of the recording head and a rear end behind the bearing surface. The reader has a non-rectangular shape with a front-end width that is less than an average width of the reader. A first bias element is positioned proximate to a first side of the reader, and a second bias element is positioned proximate to a second side of the reader. Each of the first and second bias elements has a bias level that is a function of a ratio of the front-end width to the average width of the reader.

In another embodiment, an apparatus is provided. The apparatus includes a reader having a front end at a bearing surface and a rear end behind the bearing surface. The reader has a non-rectangular shape with a front end thickness that is less than an average thickness of the reader.

In yet another embodiment, a method forming a recording head is provided. The method includes forming a non-rectangular reader having a front end at a bearing surface of the recording head and a rear end behind the bearing surface. The reader has a front-end width that is less than an average width of the reader. The method further includes forming a first bias element positioned proximate to a first side of the reader, and forming a second bias element positioned proximate to a second side of the reader. Each of the first and second bias elements is provided with a bias level that is a function of a ratio of the front-end width to the average width of the reader.

This summary is not intended to describe each disclosed embodiment or every implementation of the readers. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments described below relate to a reader with a shape optimized for a relatively high signal-to-noise ratio (SNR) and the biasing of such a reader. However, prior to providing additional details regarding the different embodiments, a description of an illustrative operating environment is provided below.

Figure 1:
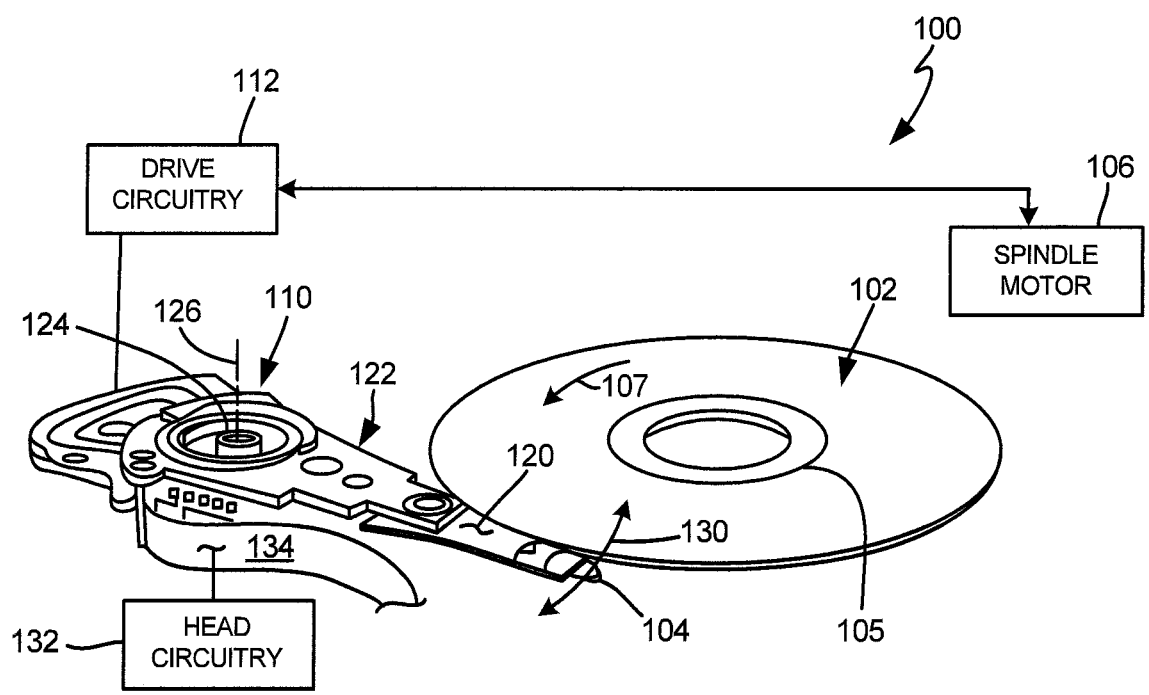
FIG. 1 illustrates an embodiment of a data storage device in which embodiments of the present application can be used.

FIG. 1 shows an illustrative operating environment in which certain reader embodiments formed as disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and writing data to the data storage medium. As shown in FIG. 1, the data storage device 100 includes a data storage medium or disc 102, which may be a magnetic storage disc, and a head 104. The head 104 including transducer elements (not shown in FIG. 1) is positioned above the data storage medium 102 to read data from and write data to the data storage medium 102. For read and write operations, a spindle motor 106 (illustrated schematically) rotates the medium 102 as illustrated by arrow 107 and an actuator mechanism 110 positions the head 104 relative to data tracks (e.g., track 105) on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The transducer elements of the head 104 are coupled to head circuitry 132 through flex circuit 134, also known as printed circuit cable assembly (PCCA), to encode and/or decode data. Although FIG. 1 illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 2:
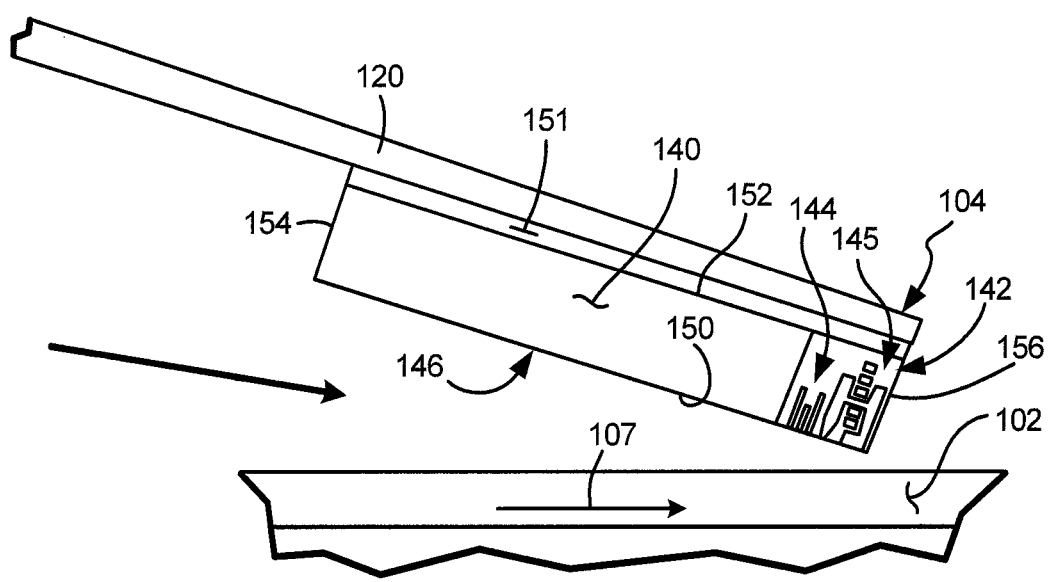
FIG. 2 is a schematic illustration of a head including one or more transducer elements above a magnetic recording medium.

FIG. 2 is a detailed illustration (side view) of the head 104 above the medium 102. The transducer elements on the head 104 are fabricated on a slider 140 to form a transducer portion 142 of the head 104. The transducer portion 142 shown in FIG. 2 includes a read element 144 and a write element 145. Alternatively, the head 104 may be a head exclusively for reading that includes only the read element 144 and no write element 145.

As shown, the head 104 includes a bearing surface (for example, an air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 2 along the ABS 146 of the slider 140 from a leading edge 154 to the trailing edge 156 of the slider 140 or head 104. Air flow along the air bearing surface 146 creates a pressure profile to support the head 104 and slider 140 above the medium 102 for read and write operations.

Modern readers are becoming progressively SNR-starved. This may happen, for example, in readers with low reader widths (RWs), in readers that have recessed antiferromagnetic (AFM) layers, and in readers employed in heat-assisted magnetic recording (HAMR) devices. Readers with low RWs may have lower SNR due to the higher magnetic noise caused by lower reader volume and due to the lower Vin (voltage seen by a preamplifier (not shown) connected to the reader) caused by higher resistance. A reader with a recessed AFM may have a lower SNR due to a noisier synthetic antiferromagnetic (SAF) structure. In HAMR recording, media fields may be relatively weak, thereby negatively impacting signal amplitude and thus SNR. The lower SNR becomes an impediment to further ADC increase.

To address the above-noted problems, embodiments of the disclosure provide a reader design having higher volume, higher area, and shape anisotropy shifted in cross-track and/or downtrack directions compared to a conventional rectangular reader with a same width at the ABS. One example of such a reader is provided below in connection with FIGS. 3A and 3B.

Figure 3A:
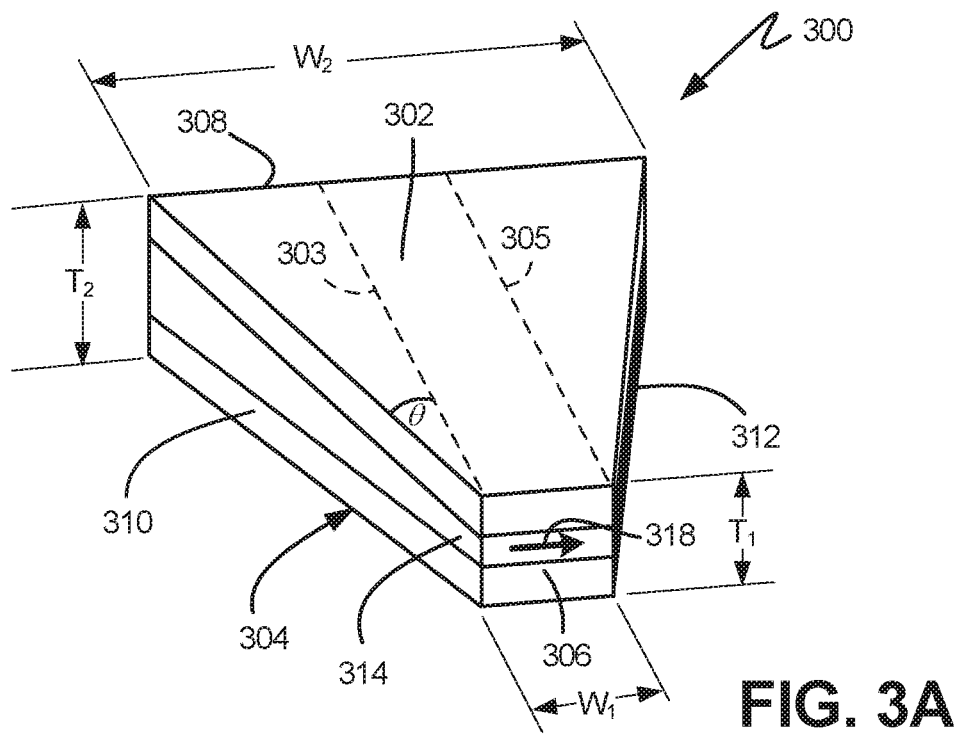
FIG. 3A is a diagrammatic illustration of a trapezoidal read sensor in accordance with one embodiment.

FIG. 3A is a diagrammatic illustration of a trapezoidal reader 300 in accordance with one embodiment. Trapezoidal reader 300 includes an upper surface 302, a lower surface 304, a front surface 306, a rear surface 308 and side surfaces 310 and 312. Front surface 306 of the trapezoidal 300 forms a portion of bearing surface 146 shown in FIG. 2. In FIG. 3A, an x-direction is a cross-track direction, a z-direction is a downtrack direction and a y-direction, which is perpendicular to x and z simultaneously, is a stripe-height direction.

In a conventional rectangular reader, a width $W_1$ is the same along an entire strip-height of the reader as shown by dashed lines 303 and 305. Similarly, a thickness $T_1$ of the conventional rectangular reader is the same along the entire stripe-height direction.

In the embodiment of FIG. 3A, both upper surface 302 and lower surface 304 of reader 300 are trapezoidal in shape, and front surface 306 and rear surface 308 are rectangular in shape. Accordingly, a width $W_2$ of rear surface 308 is greater than $W_1$. If separation distances between the upper surface 302 and the lower surface 304 of reader 300 are the same at both the front and the rear ends, then side surfaces 310 and 312 of trapezoidal reader 300 are also rectangular in shape. In this case, thickness $T_2$ at the rear end would be the same as $T_1$. If a separation distance between the upper surface 302 and the lower surface 304 of sensor 300 at the front end is different from the separation distance between the upper surface 302 and the lower surface 304 at the rear end, then sides surface 310 and 312 of trapezoidal reader 300 may be trapezoidal in shape. In this case, thickness $T_2$ at the rear end would be different from $T_1$. In different embodiments, $W_2$ may be greater than $W_1$ and/or $T_2$ may be greater than $T_1$.

The above-described trapezoidal reader is only one example of a reader embodiment of the disclosure and examples of reader embodiments with other possible shapes are provided further below. In general, in embodiments of the disclosure, the reader has a non-rectangular shape with a front-end or bearing surface width that is less than an average width of the reader and/or a front-end or bearing surface thickness that is less than an average thickness of the reader.

Figure 3B:
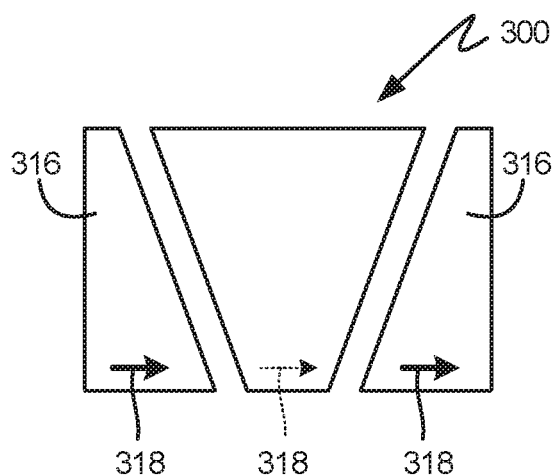
FIG. 3B is top view of the trapezoidal reader of FIG. 3A along with biasing elements for the trapezoidal reader in accordance with another embodiment.
Figure 3C:
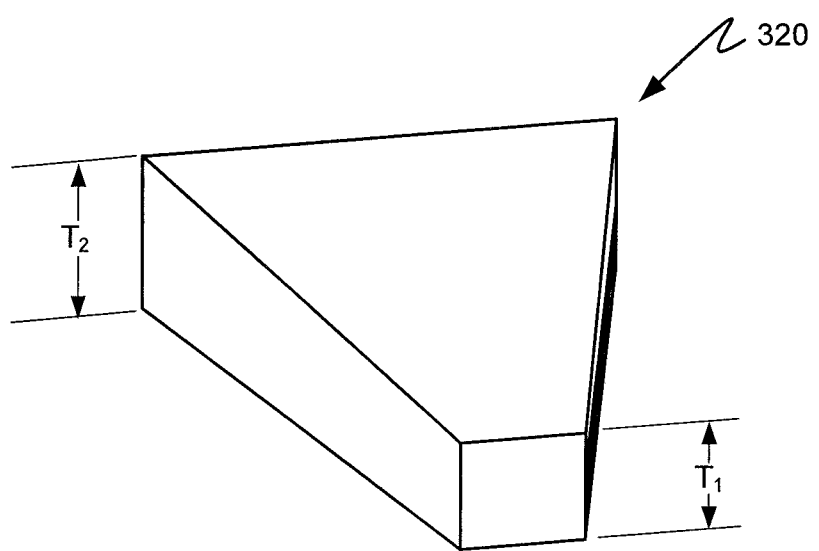

Referring back to FIG. 3A, reader 300 may be a magnetoresistive sensor that includes a plurality of layers including a free layer or sensing layer 314 and other layers such as a reference layer and a pinned layer that are antiferromagnetically coupled, etc. Only the free layer 314 is separately shown to simplify the drawing. FIG. 3B illustrates a top view of reader 300 with side bias elements 316 for the free layer 314. Each side bias element 316 may include a permanent magnet and/or a soft ferromagnetic side shield. The bias elements 316 produce a magnetic field that biases the free layer 314 with a magnetic moment that may be parallel to the bearing surface and generally oriented horizontally, as indicated by arrows 318. This bias prevents the magnetic moment of the free layer 314 from drifting due to, for example, thermal energy, which may introduce noise into the data sensed by the reader 300. However, the bias is sufficiently small to allow the magnetic moment 318 of the free layer 314 to change in response to an applied magnetic field, such as a magnetic field of a data bit stored on the data disc(s). FIG. 3C is a general embodiment of a trapezoidal reader 320 that includes a layer (e.g., a free layer) that has a rear end thickness $T_2$ that is greater than a front end thickness $T_1$.

Reader embodiments of the disclosure increase SNR because:
 (1) A higher reader area reduces reader resistance and thus increases Vin for a given low frequency amplitude (LFA), which is an amplitude measured at the reader when it reads long bits from a data storage medium.
 (2) A higher reader volume reduces magnetic noise due to the statistical averaging of magnetic oscillations in the reader.
 (3) Replacing part of the permanent magnet or side shield free layer bias with cross-track magnetic anisotropy (e.g., shape anisotropy) suppresses magnetic noise. This is described below in connection with FIG. 4.

Figure 4:
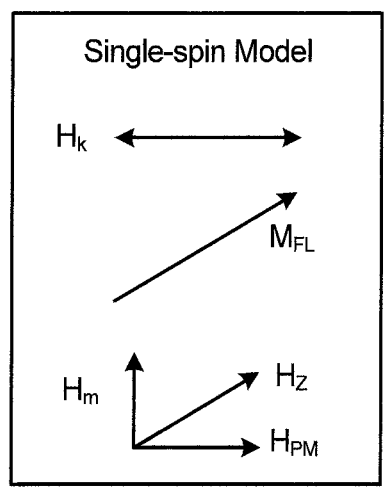
FIG. 4 is a diagrammatic illustration showing fields applied to a free layer of a reader.

FIG. 4 is a diagrammatic illustration showing fields applied to a free layer of a reader. In FIG. 4, $H_k$ is a cross-track anisotropy field, $M_{FL}$, is a magnetization of the free layer, $H_z$ is a Zeeman field, which is a demagnetization field that comes from two sources: i) A first field component $H_{PM}$ that is a biasing field that originates from side bias elements (e.g., permanent magnets or side shields) and ii) A second field component $H_m$ that is a signal field that originates from the data storage medium. $H_{PM}$ and $H_k$ bias the free layer of the reader. As can be seen in FIG. 4, $H_{PM}$ and $H_k$ have different symmetry, with $H_{PM}$ being unidirectional and $H_k$ being uniaxial (as shown by two arrow heads in FIG. 4). Angular displacements of $H_k$ and $H_z$ are also different, with $H_k$ changing faster than $H_z$ with a change in direction of an externally applied field.

In general, the effective free layer bias depends on the Zeeman energy of its interaction with the biasing structures (e.g., permanent magnets or side shields) and on the magnetic anisotropy created by the shape of the free layer and/or by its intrinsic magnetic properties. The energy of these two interactions can be expressed as $$E_z = -M_{FL} H_z \cos(H_z - M_{FL}) \qquad \text{Equation 1}$$

$$E_K = K_U \sin^2(H_k - M_{FL}) = \frac{M_{FL} H_K}{2} \sin^2(H_k - M_{FL}) = \qquad \text{Equation 2}$$
$$\frac{M_{FL} - H_K}{4}(1 - \cos(2(H_k - M_{FL})))$$

In Equations 1 and 2, $E_z$ and $E_k$ are the Zeeman energy and the anisotropy energy, respectively, and $K_U$ is a magnetic anisotropy parameter. It should be noted that, in Equations 1 and 2, the notations in sin( ) and cos( ) imply the angles of the corresponding vectors $H_z$, $M_{FL}$ and $H_k$. Anisotropy energy dependence on free layer angle is sharper than the Zeeman energy dependence (e.g., a double angle in Equation 2 compared to a single angle in Equation 1). Therefore, cross-track anisotropy makes the potential well steeper and thus reduces noise amplitude for a given energy (e.g., temperature).

Figure 5:
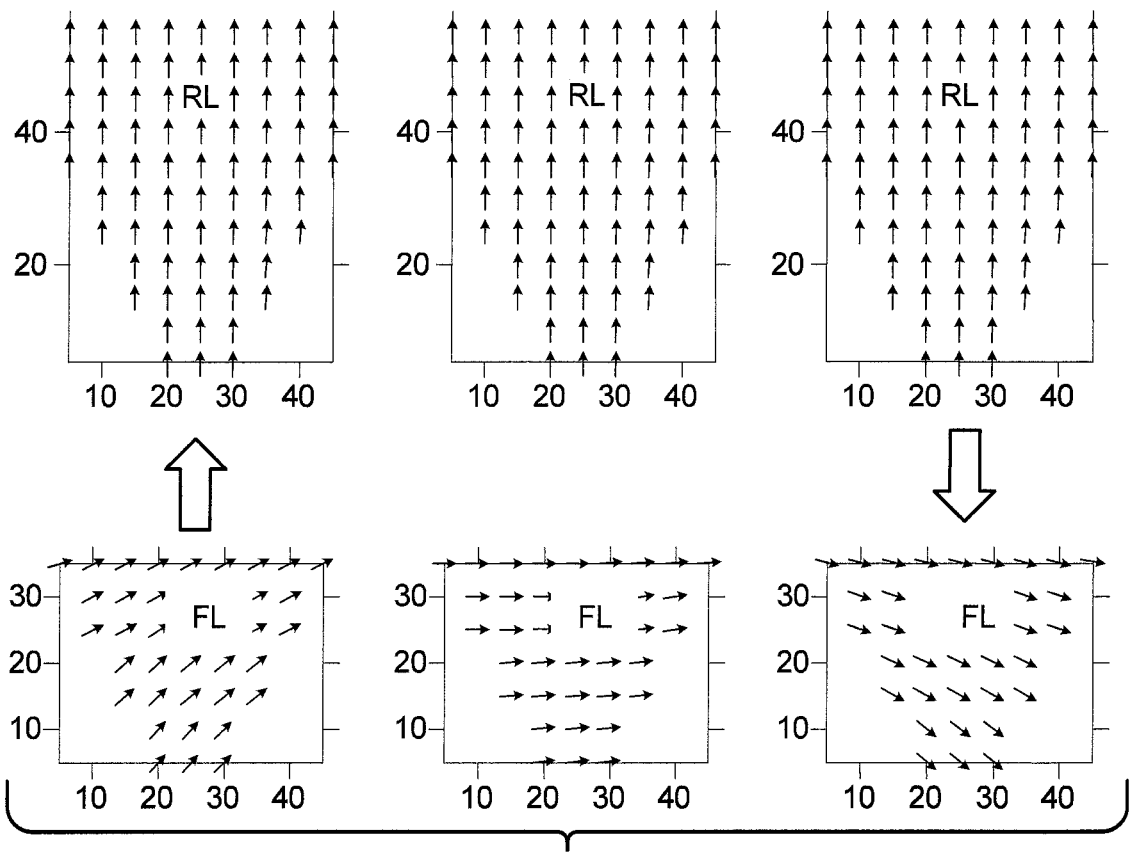
FIG. 5 shows a micromagnetic picture of a trapezoidal reader in positive, zero and negative fields.

Micromagnetic modeling of SNR in a trapezoid reader and in a conventional rectangular reader was performed using a same reader width at the ABS for both readers. FIG. 5 shows a micromagnetic picture of a trapezoidal reader in positive, zero and negative fields. The left portion of FIG. 5 shows magnetic profiles of the free layer (FL) and reference layer (RL) when under the influence of a positive external field (e.g., a positive media field). The middle portion of FIG. 5 shows FL and RL magnetic profiles without the influence of an external field, and the right portion of FIG. 5 shows FL and RL magnetic profiles when under the influence of a negative external field (e.g., a negative media field). The magnetic profiles of the FL and the RL of the trapezoidal reader under the three external field conditions correspond to the magnetic profiles of the FL and the RL of the conventional reader under the same three external field conditions.

Figure 6A:
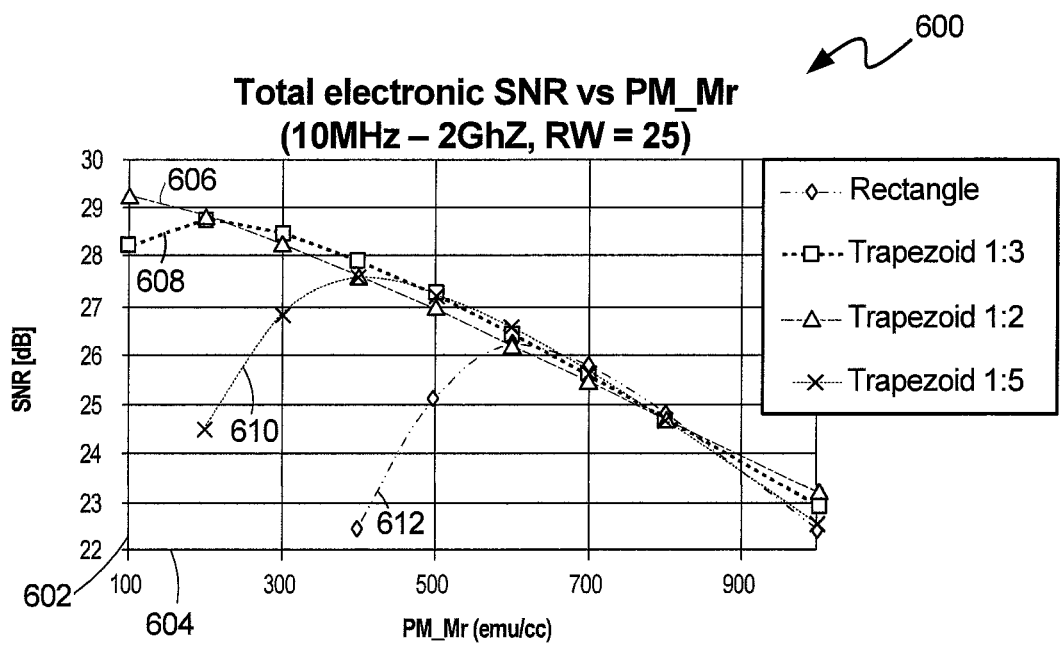
FIGS. 6A and 6B are graphs illustrating comparisons between a rectangular reader and trapezoidal readers.

FIG. 6A is a graph 600 including plots that illustrate an influence of biasing on different reader designs, with each of the different designs having a same reader width at the ABS. In FIG. 6A, a vertical axis 602 represents SNR in decibels (dB) and a horizontal axis 604 represents magnetic moment of a permanent magnet or side shield (PM_Mr) in electromagnetic units (emu)/cubic centimeter (cc). Plots 606-610 are for trapezoidal readers with different angles (Θ in FIG. 3A). For example, plot 608 is for a trapezoidal reader 1:3, which means that tan (Θ) is ⅓. Plot 612 if for a conventional rectangular reader where Θ or tan (Θ) is zero. As can be seen from plot 612, a maximum SNR value for the conventional rectangular reader is obtained when a permanent magnet or side shield strength PM_Mr is about 600 emu/cc. In contrast, plots 606-610 show that a substantial increase in SNR may be obtained for a trapezoidal reader with a choice of permanent magnet strength that is substantially lower than 600 emu/cc in the example of FIG. 6A. For example, plot 608 (trapezoid 1:3) has a maximum SNR value when PM_Mr is about 200 emu/cc. In general, in the case of trapezoidal readers, a proper choice of permanent magnet strength (or side shield strength) can provide significant improvement in SNR over a conventional rectangular reader having the same ABS width as the trapezoidal readers. It should be noted that, in embodiments of the disclosure, decreases in bias field are intentionally done both at the ABS and behind the ABS. The bias reduction is not inherent to the reader and permanent magnet/side shield structure, but deliberately chosen for different angles of the trapezoid, for example.

Figure 6B:
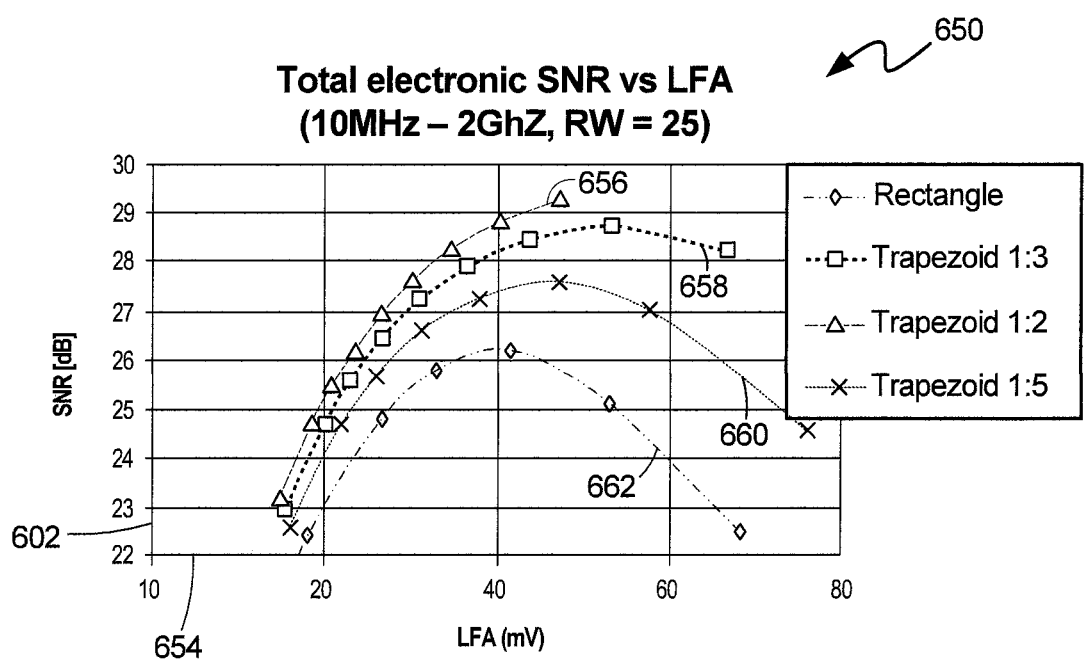

FIG. 6B is a graph 650 that illustrates total electronic SNR (vertical axis 602) versus LFA (horizontal axis 654) in millivolts (mV) for the same reader designs used to obtain the plots of FIG. 6A. Plots 656-660 are for the trapezoidal readers with different angles (Θ in FIG. 3A), and plot 662 is for the conventional rectangular reader. As can be seen in FIG. 6B, LFA values for plots 656-662 and similar with SNR values being substantially higher in trapezoidal reader plots 656-660. LFA values for the trapezoidal readers should be similar to the LFA values for the rectangular reader for optimal rotation of the free layers of the trapezoidal readers. Indeed, too much rotation of the free layer magnetization can lead to an unacceptably high asymmetry sigma and too little rotation will yield low amplitude and low SNR. Thus, trapezoidal readers provide a substantial improvement in SNR without any negative impacts on the rotation of the free layer. Experimental results have also shown that reader micro track 10 (MT10) does not increase substantially even when the trapezoid slope is relatively large (e.g., 1:2), which indicates that the trapezoidal shape does not negatively impact cross-track performance relative to a rectangular reader.

Figure 7:
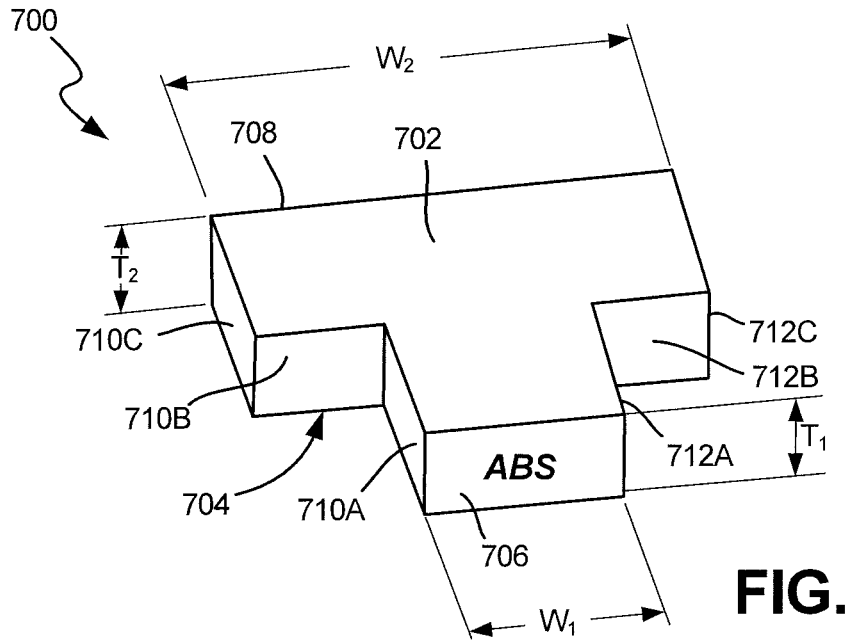
FIGS. 7-11 are diagrammatic illustrations of different reader embodiments.
Figure 8:
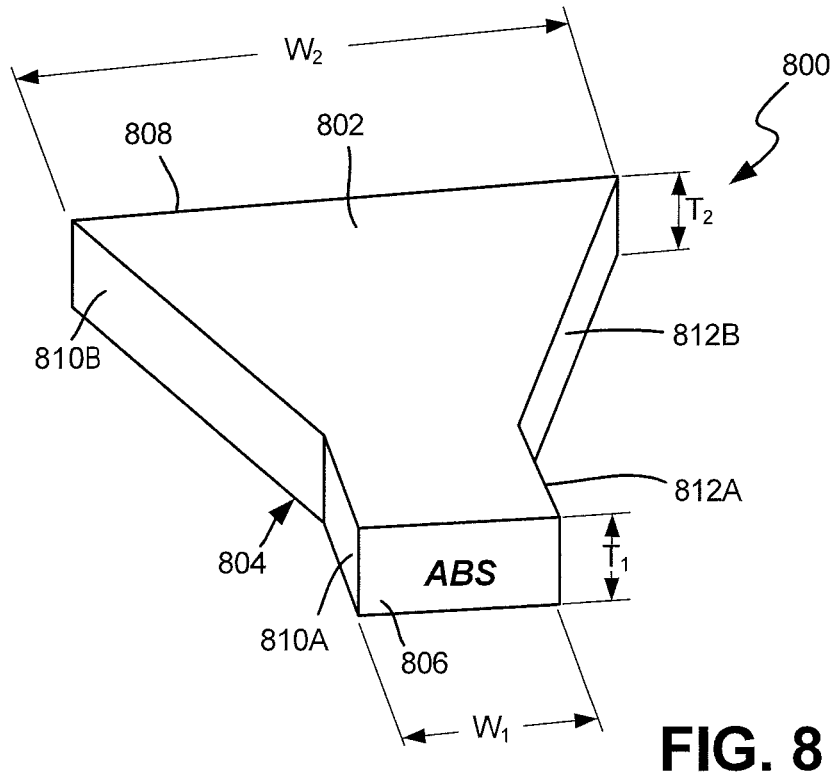

FIGS. 7 and 8 are diagrammatic illustrations of other examples of non-rectangular readers in accordance with embodiments of the disclosure. The reader shapes shown in FIGS. 7 and 8 extend in the cross-track direction while departing from the ABS.

FIG. 7 is a diagrammatic illustration of a T-shaped reader 700 embodiment. T-shaped reader 700 includes an upper surface 702, a lower surface 704, a front surface 706, a rear surface 708 and first side surfaces 710A, 710B and 710C and second side surfaces 712A, 712B and 712C. Front surface 706 of the T-shaped reader 700 forms a portion of bearing surface 146 shown in FIG. 2. As can be seen in FIG. 7, width $W_t$ is less then width $W_2$, and thickness $T_1$ is substantially equal to thickness $T_2$.

FIG. 8 is a diagrammatic illustration of a funnel-shaped reader 800 embodiment. Funnel-shaped reader 800 includes an upper surface 802, a lower surface 804, a front surface 806, a rear surface 808 and first side surfaces 810A and 810B and second side surfaces 812A and 812B. Front surface 806 of the funnel-shaped reader 800 forms a portion of bearing surface 146 shown in FIG. 2. As can be seen in FIG. 8, width $W_t$ is less then width $W_2$, and thickness $T_1$ is substantially equal to thickness $T_2$.

As described earlier in connection with FIG. 3A, trapezoidal reader 300 may be extended in thickness in the downtrack direction while departing from the ABS. Other examples of non-rectangular readers extended in thickness in the downtrack direction are provided in FIGS. 9, 10 and 11.

Figure 9:
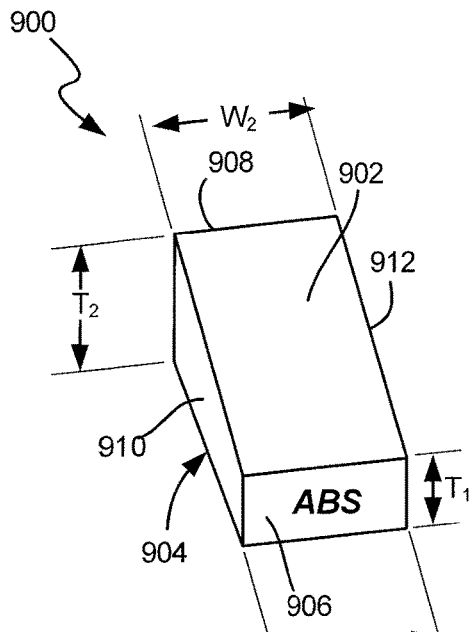

FIG. 9 is an example of a non-rectangular reader 900 in which there is an extension in thickness in the downtrack direction while departing from the ABS, but no extension in the cross-track direction. Non-rectangular reader 900 includes an upper surface 902, a lower surface 904, a front surface 906, a rear surface 908 and side surfaces 910 and 912. Front surface 906 of the reader 900 forms a portion of bearing surface 146 shown in FIG. 2. As can be seen in FIG. 9, width $W_i$ is substantially equal to width $W_2$, and thickness $T_1$ is less than thickness $T_2$.

Figure 10:
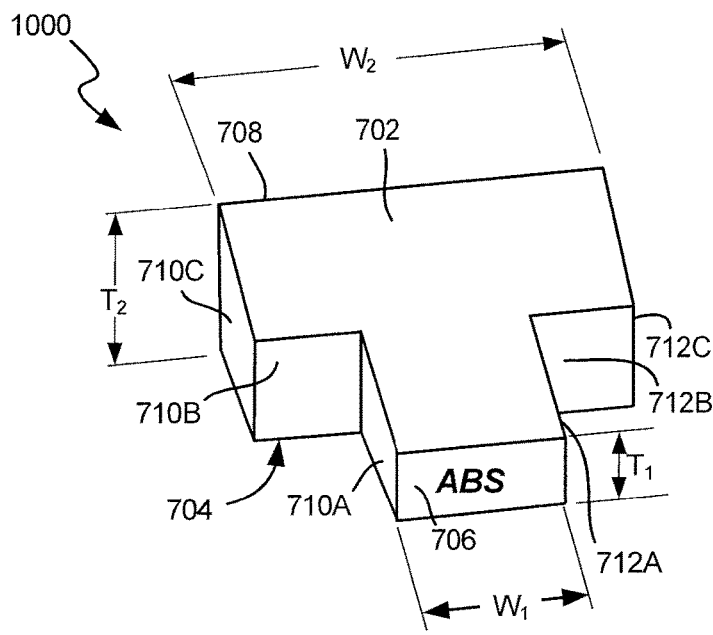
Figure 11:
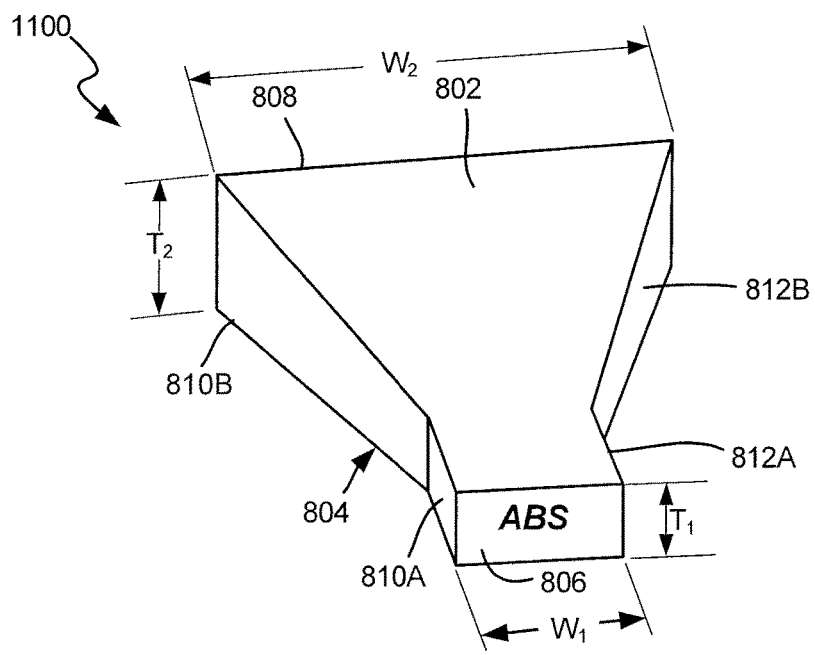

FIG. 10 (reader 1000) and FIG. 11 (reader 1100) are similar to reader 700 (FIG. 7) and reader 800 (FIG. 8), respectively. However, in addition to width $W_i$ being less than width $W_2$, thickness $T_1$ is less than thickness $T_2$ in readers 1000 and 1100.

Figure 12:
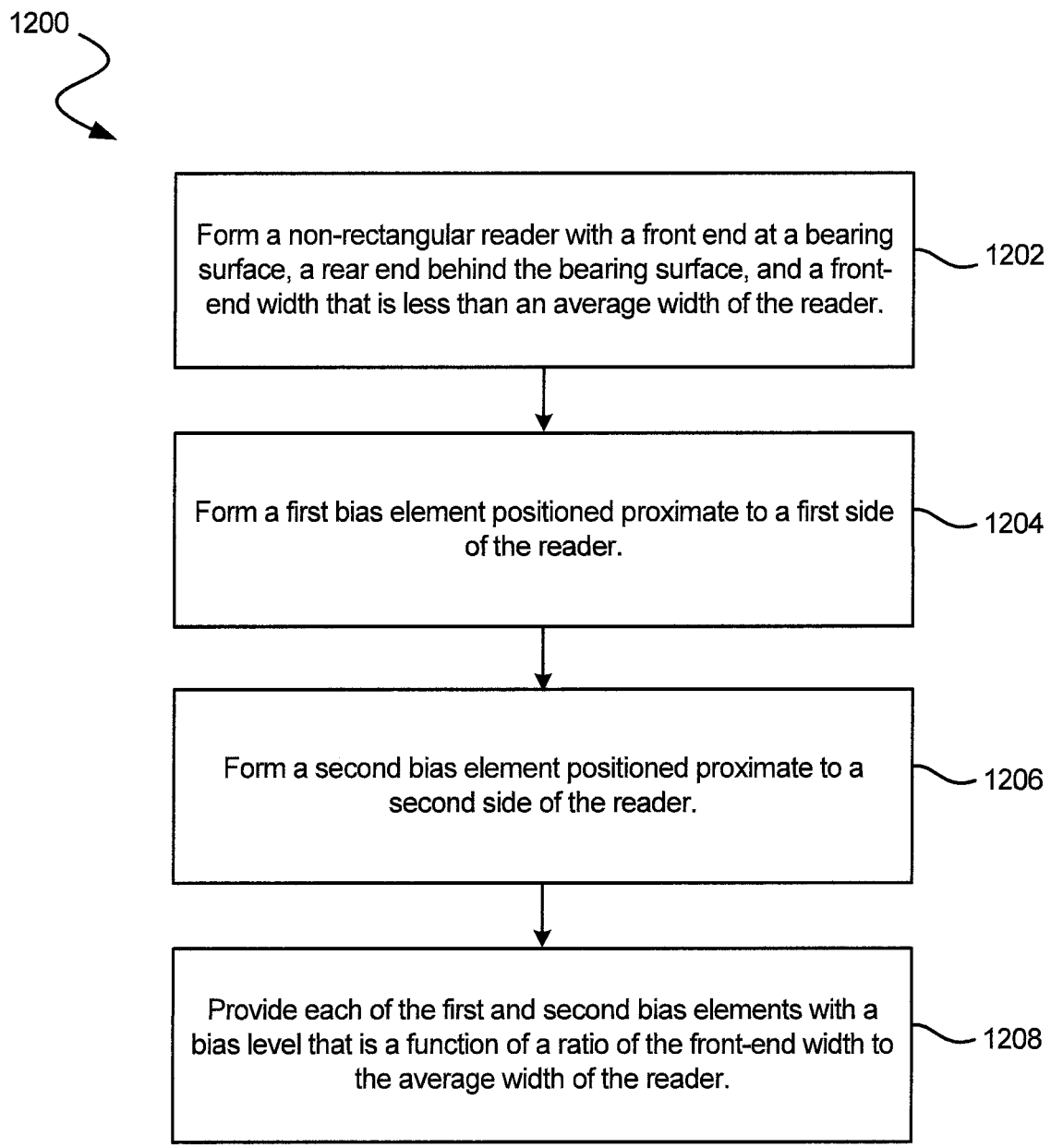
FIG. 12 is a flow diagram of a method embodiment.

FIG. 12 is a flow diagram 1200 in accordance with a method embodiment. The method includes, at step 1202, forming a non-rectangular reader having a front end at a bearing surface of the recording head and a rear end behind the bearing surface. The reader has a front-end width that is less than an average width of the reader. The method further includes forming a first bias element positioned proximate to a first side of the reader at step 1204 and, at step 1206, forming a second bias element positioned proximate to a second side of the reader. At step 1208, each of the first and second bias elements are provided with a bias level that is a function of a ratio of the front-end width to the average width of the reader.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
    a magnetoresistive sensor comprising:
        a front end at a bearing surface;
        a rear end behind the bearing surface;
        the magnetoresistive sensor having a non-rectangular shape with at least one layer of the magnetoresistive sensor other than a cap layer having a front end thickness that is less than an average thickness of the at least one layer, and a thickness of the at least one layer gradually increasing from the front end to the rear end;
    a first bias element positioned proximate to a first side of the magnetoresistive sensor; and
    a second bias element positioned proximate to a second side of the magnetoresistive sensor.

2. The apparatus of claim 1 and wherein the magnetoresistive sensor further comprises a front-end width that is less than an average width of the magnetoresistive sensor.

3. The apparatus of claim 2 and wherein:
    each of the first and second bias elements comprises a bias level that is a function of a ratio of the front-end width to the average width of the magnetoresistive sensor.

4. The apparatus of claim 1 and wherein the non-rectangular shape is a substantially trapezoidal shape.

5. The apparatus of claim 1 and wherein the non-rectangular shape is a substantially T-shape.

6. The apparatus of claim 1 and wherein the non-rectangular shape is a substantially funnel shape.

7. A method comprising:
    selecting a trapezoidal angle for a substantially trapezoidal reader to be formed with a front end at a bearing surface of the reader and a rear end behind the bearing surface of the reader, the trapezoidal angle being in a plane of a layer of the substantially trapezoidal reader, with the plane being perpendicular to the bearing surface;
    selecting a bias strength for the substantially trapezoidal reader based on the selected trapezoidal angle, the bias strength being one of a plurality of different bias strengths, with each different one of the plurality of different bias strengths corresponding to a different one of a plurality of different trapezoidal angles, the plurality of different trapezoidal angles including the selected trapezoidal angle, wherein the selection of the bias strength depends inversely on a size of the trapezoidal angle;
    forming the substantially trapezoidal reader with the selected trapezoidal angle; and
    forming a first bias element proximate to a first side of the substantially trapezoidal reader, and forming a second bias element proximate to a second side of the substantially trapezoidal reader, such that the first bias element and the second bias element provide the selected bias strength.

8. The method of claim 7 and further comprising forming the substantially trapezoidal reader with a front-end thickness that is less than an average thickness of the reader.

9. The method of claim 7 and further comprising forming the substantially trapezoidal reader with a front-end thickness that is less than a back-end thickness of the substantially trapezoidal reader.

* * * * *